United States Patent [19]
Huder

[11] Patent Number: 5,308,566
[45] Date of Patent: May 3, 1994

[54] METHOD FOR PRODUCING FORMED BLANKS FROM THERMOPLASTICALLY WORKABLE COMPONENT MIXTURES

[75] Inventor: Marcel Huder, Cham, Switzerland
[73] Assignee: Naturalis AG, Switzerland
[21] Appl. No.: 958,910
[22] Filed: Oct. 6, 1992
[30] Foreign Application Priority Data
  Oct. 7, 1991 [CH] Switzerland ............ 02941/91
[51] Int. Cl.⁵ .............................. B29B 9/00
[52] U.S. Cl. ........................ 264/118; 264/142; 426/454
[58] Field of Search ............. 264/118, 141, 142; 426/454

[56] References Cited

U.S. PATENT DOCUMENTS

| | | |
|---|---|---|
| 2,645,587 | 7/1953 | Williamson . |
| 3,574,632 | 4/1971 | Lanz . |
| 4,341,180 | 7/1982 | Cortigene et al. ............ 264/118 |
| 4,882,105 | 11/1989 | Volk, Jr. ............ 264/40.1 |
| 4,929,163 | 5/1990 | Volk, Jr. ............ 425/143 |

FOREIGN PATENT DOCUMENTS

| | | |
|---|---|---|
| 0040406 | 11/1981 | European Pat. Off. . |
| 2552126 | 5/1976 | Fed. Rep. of Germany . |
| 4027786 | 4/1992 | Fed. Rep. of Germany . |
| 2349286 | 11/1977 | France . |
| 9005161 | 10/1989 | PCT Int'l Appl. . |

*Primary Examiner*—Mary Lynn Theisen
*Attorney, Agent, or Firm*—Speckman, Pauley & Fejer

[57] ABSTRACT

A method for producing formed blanks wherein the components are premixed in a first stage and metered. Heat and moisture are added to the mixture in a controlled manner and the mixture is then formed into pellets. The pellets are cooled with air, comminuted and further processed into formed blanks after storage for an arbitrary length of time. The method of this invention leads to more homogeneous and improved results and is extremely inexpensive.

12 Claims, 2 Drawing Sheets

METHOD FOR PRODUCING FORMED BLANKS FROM THERMOPLASTICALLY WORKABLE COMPONENT MIXTURES

BACKGROUND OF THE INVENTION

1. Field of the Invention

This invention relates to a method for producing formed blanks from thermoplastically workable component mixtures which predominantly contain raw vegetable materials with a starch component and which are put into their final shape by using thermoplastic or duroplastic deformation in an extrusion molding machine.

2. Description of the Prior Art

First experiments to form component mixtures from edible materials which are thermoplastically workable and can be made into formed blanks have been known since early 1950. An example is shown in U.S. Pat. No. 2,645,587. The particular basis here is a lignocellulose material, for example nut shells, straw, rice hulls, corncobs and the like. However, all of such experiments have not been developed beyond the laboratory stage. German Patent Publication DE-A-25 52 126 discloses a thermoplastically workable and water-soluble mold mass, which is also suitable for producing formed blanks. The described component mixtures essentially consist of parts of starch, casein-sodium as well as glycerin and a part of gelatin and lecithin. All of such mixtures are worked in a mixer, a double-cylinder mill or a masticator into a fine-grained mass which is placed into the funnel of an extruder and processed into the desired formed blanks in a thermoplastic extrusion process.

Another solution is taught by PCT Reference WO90/05161. Here, an additive is admixed to essentially native and natural starch to produce a thermoplastically workable starch and the mixture is melted by the addition of heat and mechanical energy. The additive is a substance which lowers the melting temperature of the starch, so that the melting temperature of the starch together with this additive lies below the decomposition temperature of the starch. While the basis of the component mixtures so far described is an inhomogeneous mixture, and this inhomogeneity is maintained, the natural starch is worked into a melted mass by adding additives and heat, which subsequently is further processed in the form of granulates, pills, tablets or powders. This involves a process which requires a relatively large amount of energy and in which a final product, although biodegradable, loses its natural appearance.

Various thermoplastically workable component mixtures for producing service articles, articles for daily use and for packaging, are described in German Patent Publication DE-A-40 27 786. All of such component mixtures essentially consist of vegetable parts kept in their natural state as much as possible and consist of components of starch, glycerin and preservatives, as well as the addition of fillers containing vegetable proteins as binders and possibly dextrins for making the surface shiny. These components are mixed and subsequently directly worked in duroplastic or thermoplastic machines. The results derived from such teachings are extremely different. It is hardly possible to obtain reproducible results from the same composition of the mixture. It is assumed that the compression and heating of the component mixtures in the extruder worm leads to structural changes which are so complex that they can hardly be kept under control.

Of course, it is known from many patent publications, such as French FR-A-2 349 286, U.S. Pat. No. 4,929,163, European EP-A-0 040 406 and U.S. Pat. No. 3,574,632, how to produce cubes of feed in pellet mills. The materials to be worked have a certain similarity with those for producing thermoplastic or duroplastic formed blanks, but this process represents the last change in shape. Certain subsequent processes then only address the improvement of sterility or shelf life.

In contrast thereto it is not know from the prior art that when producing formed blanks or pellets from thermoplastically or duroplastically workable biomasses, another form of producing the granulate, than that in the extruder press, is used prior to shaping in a plastic molding machine. However, this form of processing has proven to be unusable, because the strongly inhomogeneous mixtures result in an intermediate product which has unequal physical properties and in this way leads to results during the final thermoplastic or duroplastic processing into formed blanks, which are not continuously reproducible.

SUMMARY OF THE INVENTION

It is therefore one object of this invention to provide a method for producing formed blanks or pellets from thermoplastically workable component mixtures, which has a high degree of reliability and leads to controlled results which are reproducible.

This object is achieved with a method wherein formed blanks are produced from component mixtures which predominantly contain raw vegetable materials with a starch component, and which are put into final shape using thermoplastic or duroplastic deformation in an extrusion molding machine. Prior to final shaping, the premixed component mixture is passed through pellet mill via a feed device and a mixing device while moisture and heat are added. Only a partial agglutination of the starch occurs, after which the pellets are cooled and temporarily stored for an arbitrary length of time. There is the possibility of regulating the addition of moisture and the heat supply with steam. This has a number of advantages.

The use of steam increases the partial agglutination of the starch components, reduces the amount of energy required and makes possible the addition of certain additives in dissolved form.

If the addition of moisture takes place in liquid form, this can also take place at relatively low temperatures, because vegetable fat in particular is being preserved. If heat is added in spite of the addition of moisture in liquid form, such step can be done by heating the mixing apparatus. The temperature increase in the feed direction of the component mixture in the mixing apparatus can be slowly increased by heating in such way.

Because it is desirable for the pellets to have a shelf life as long as possible, the removal of moisture to a large extent is desirable, i.e. the dryness of the pellets. Moisture can be removed from the mixed material at least partially in the pellet mill. This can be accomplished, for example, by blowing relatively dry, warm air through the mill cylinder of the pellet mill.

The quality of the pellets also essentially depends on their size. For this reason, holes in the mill cylinder of the pellet mill are selected in such a way that the pellets have a maximum size of 8 mm, but preferably a size of 2 to 3 mm. The size of the pellets is in the end a measure for perfect further processing in the thermoplastic or duroplastic mold press machine. It may therefore be advantageous to comminute the pellets with a crusher prior to further processing.

The method in accordance with the invention will be described by means of the attached drawings and the following description.

DESCRIPTION OF PREFERRED EMBODIMENTS

Figure 1:
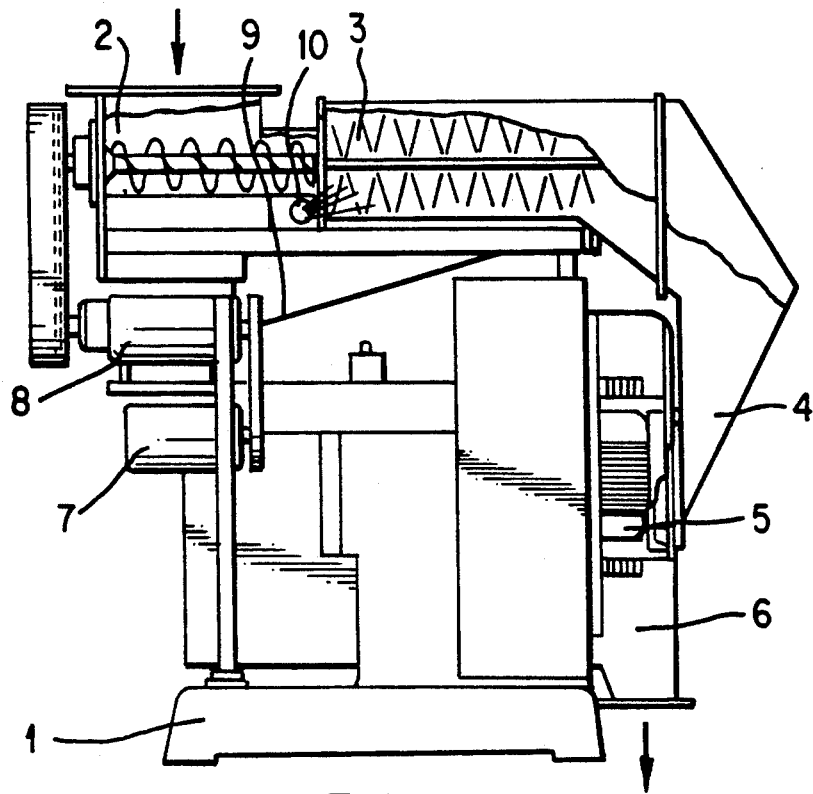
FIG. 1 is a schematic cross-sectional view showing some conventional components of a typical pellet mill.

The pellet mill for the method, according to one preferred embodiment of this invention, is shown in FIG. 1.

It rests on a frame 1 and has a feed device 2 at the top portion. The premixed component mixture enters the feed device 2 via a feeding funnel, not shown in the drawings. The device is used for metered feeding of the component mixture into a succeeding mixing apparatus 3. This is done by means of a conveyor worm positioned in the feed device. The premixed component mixture is again forcefully mixed together in the mixing apparatus 3 and is moistened by means of a moisture connection 10, such as a sprayer. This can be done by means of steam, for example. This may be pure water vapor or also water vapor to which certain soluble components have been added. As a preferred rule, a moisture content of less than approximately 5%, related to the mixed material, is used. The heat supply, which also takes place in this area, can either be provided by the steam or, in a separate process, by providing the mixing apparatus 3 itself with a heater. In this case, the mixing apparatus 3 can be divided into different heating zones over its entire length. The component mixture conveyed out of the mixing apparatus 3 reaches the mill part 5 via the inlet 4, which is shown in detail in FIG. 2. The mill cylinder 11 is driven by a motor via a V-belt drive 6. A motor 7 operates the mixing apparatus 3 as well as the feed device 2 via a variable speed gear 8.

Figure 2:
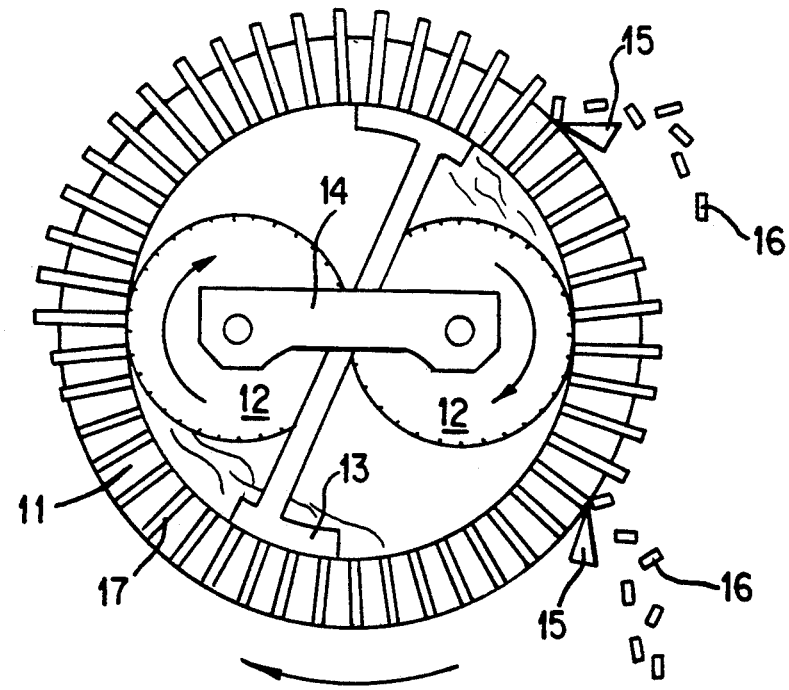
FIG. 2 is a simplified illustration of the mill cylinder of the pellet mill according to this invention.

The mill part 5 is shown in detail in a larger scale in FIG. 2. The actual mill cylinder is designated by element reference numeral 11. The component mixture arrives at the mill cylinder 11 from the mixing apparatus 3. Two mill rollers 12 are positioned on a roller bar 14 inside the mill cylinder 11. A distribution device 13 assures even distribution of the component mixture in the area of the mill rollers 12 which turn in the same direction as the rotating mill cylinder 11. The component mixture is pressed between the rotating mill cylinder 11 and the mill rollers 12, which are taken along by it, and is pressed or extruded under high pressure through the holes 17. This causes solidification of the component mixture. The agglutinating starch and other materials act as binders at this point. The extruded pieces or pellets discharged from the rotating mill cylinder 11 are scraped off the exterior wall of the mill cylinder 11 by stripping knives 15. The desired pellets are formed in this manner. The pellets fall out of the machine at the bottom and are subsequently cooled before being stored. Cooling can take place in a shaft cooler. An arbitrary number of cooling elements are disposed therein on top of each other, depending on the desired cooling flow output and the dwell time. Such cooling elements comprise a sheet metal housing with built-in cascades or roofs. An air suction shaft is positioned laterally with respect to these shaft elements over the entire height of the cooler. A sectional flap controls the air flow. Cooling can also be performed with a conventional conveyor cooler. However, this occupies a relatively large amount of space.

Figure 3:
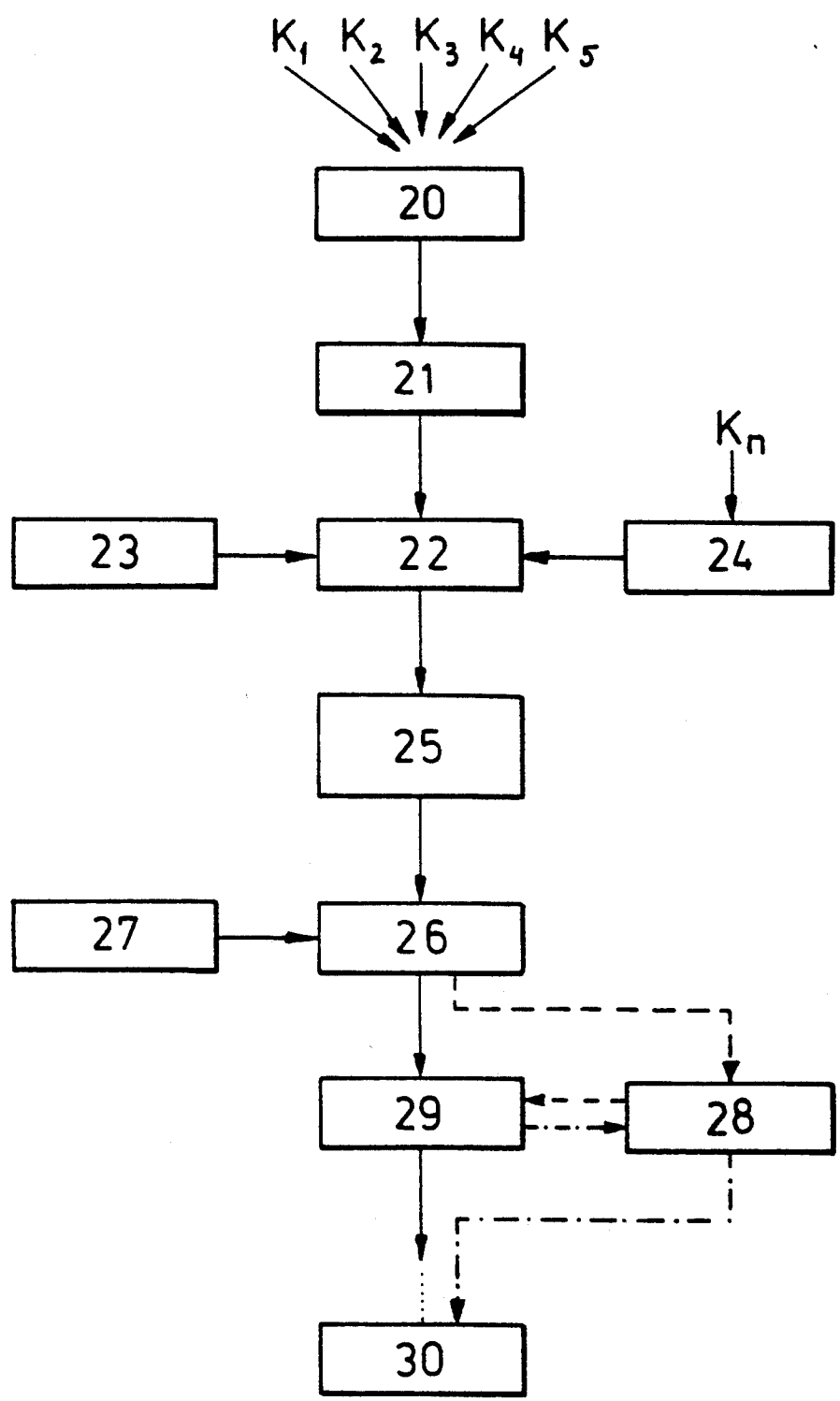
FIG. 3 is a flow chart of the method according to one preferred embodiment of this invention.

The flow chart of FIG. 3 visually displays the method of this invention. At the beginning, the several components $K_1$, $K_2$, $K_3$, $K_4$, etc., are premixed in a first stage at 20. Metering of the component mixture takes place at 21, after which it reaches the mixing apparatus, where mixing occurs. The heat supply at 23 and the addition of moisture at 24 can also be controlled there. An addition of soluble components $K_n$ can also take place via the addition of moisture at 24. This is followed by pelletizing at 25 by means of the pellet cylinder, after which the still hot pellets, which also have a small amount of moisture, are subjected to cooling at 26. This can take place by means of supplying air at 27. Direct storage at 29 or possibly prior comminution of the pellets at 28 follows. However, comminution of the pellets at 28 can also be performed after storage at 29 or may be omitted altogether. The stored pellets are then moved to 30 for further processing into formed blanks. This can take place by means of known or modified thermoplastic or duroplastic extrusion molding machines.

Comparisons have shown that formed blanks made from granulates formed on a pellet machine show exactly reproducible results, in contrast to formed blanks made directly from the biomass by means of the extrusion molding machine. They also have considerably improved and more consistent results than formed blanks made from a granulate prepared in a extrusion machine.

The pellets which can be made into formed blanks have a very low moisture content in order to obtain long shelf life. In certain applications, where the mass does not require fluidic properties, the pellets can be directly pressed into formed blanks. This has the advantage that the formed blanks require relatively little hardening time in the extrusion mold, because of which the cycling time of the extrusion process is short.

However, with other applications it is advantageous if at least one more addition of moisture takes place in the area of the extruder worm of the extrusion molding machine. This moisture addition can also be in liquid or steam form. At the same time this allows the addition of the flow and/or compacting media glycerin or collagen, as well as mixtures thereof.

The terms formed blanks and extrusion molding machines used here should be understood in their widest sense. Thus, the formed blanks can also be continuously extruded, products, such as sections, pipes or foils. By extrusion molding machine a machine is meant in general where the pellets pass through an extruder, after which they can be shaped into any one particular shape.

I claim:

1. In a method for producing formed blanks from component mixtures which comprise raw vegetable materials with a starch component and which are put into final form by thermoplastic or duroplastic deformation in an extrusion molding machine, the improvement comprising the steps of: prior to final shaping, passing the premixed component mixture through a pellet mill with a feed device and a mixing device while adding moisture and providing heat, allowing only partial agglutination of the starch, and cooling and temporarily storing formed pellets for an arbitrary length of time.

2. In a method in accordance with claim 1, wherein steam is used for the addition of moisture and supply of heat.

3. In a method in accordance with claim 1, wherein the moisture is added in liquid form.

4. In a method in accordance with claim 3, wherein the heat is supplied by heating the mixing apparatus.

5. In a method in accordance with claim 1, wherein moisture is partially removed from the mixed materials in the pellet mill.

6. In a method in accordance with claim 1, wherein the pellets are extruded through holes in a mill cylinder of the pellet mill, and the holes have a maximum clearance of 8 mm.

7. In a method in accordance with claim 6, wherein prior to further processing in the extrusion molding machine the pellets are comminuted with a crusher.

8. In a method in accordance with claim 1, wherein moisture is added to the pellets in an extruder worm of the extrusion molding machine during further processing into formed blanks.

9. In a method in accordance with claim 8, wherein the added moisture contains at least one of a flow medium and a compacting medium.

10. In a method in accordance with claim 1, wherein at least one of glycerin and collagen is used as at least one of a flow medium and a compacting medium.

11. In a method in accordance with claim 1, wherein the pellets are extruded through holes in a mill cylinder of the pellet mill, and the holes have a maximum clearance of approximately 2 mm to 3 mm.

12. In a method in accordance with claim 11, wherein prior to further processing in the extrusion molding machine the pellets are comminuted with a crusher.

* * * * *